Feb. 21, 1939.  J. E. BEVINS  2,147,962
RATE OF CLIMB INDICATOR
Filed Sept. 17, 1936   2 Sheets-Sheet 2

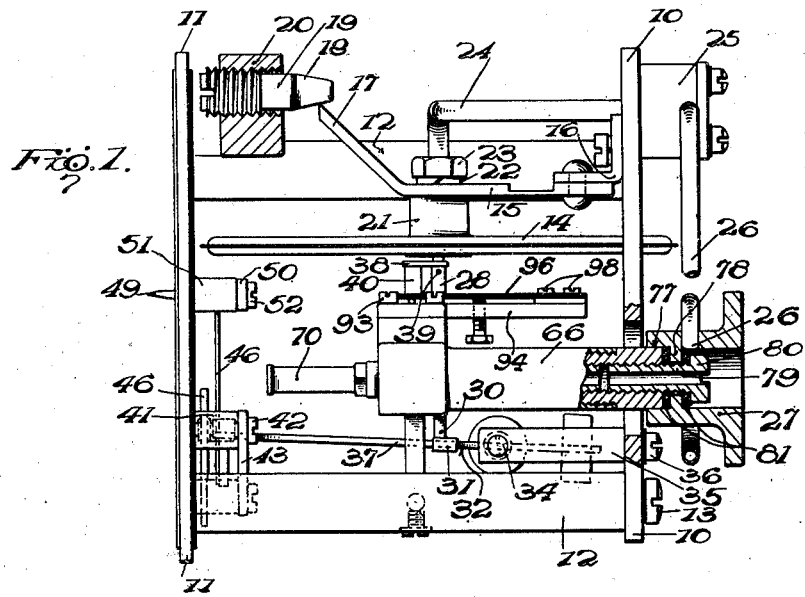

Inventor
James E. Bevins
By Stephen Cerstvik
Attorney

Patented Feb. 21, 1939

2,147,962

UNITED STATES PATENT OFFICE 2,147,962

RATE OF CLIMB INDICATOR

James E. Bevins, Bronx, N. Y., assignor to Bendix Aviation Corporation, South Bend, Ind., a corporation of Delaware Application September 17, 1936, Serial No. 101,348

26 Claims. (Cl. 264—1)

This invention relates to pressure responsive indicating instruments of the type wherein a differential between the pressures inside and outside a pressure responsive element, established by a change in one of said pressures, is utilized to operate an indicator, and wherein means are provided for the equalization of said pressures when said change no longer takes place. An example of such an instrument is a rate of climb indicator and the invention is illustrated and described hereinafter in connection with such an instrument, but it will be understood that it is not restricted to this particular use.

Instruments such as rate of climb indicators have heretofore been provided for equalization of pressures by means of a capillary tube, but in the copending application of Gregory V. Rylsky, Serial No. 101,346, filed September 17, 1936, there is disclosed the use of diffusing means whereby equalization of pressure is secured due to molecular diffusion, without the usual capillary tube. The present invention embodies diffusing means as disclosed and claimed broadly in said copending application, and one of the objects is to provide diffusing means of novel construction and design.

Another object of this invention is to provide a novel rate of climb indicator in which the pressure differential is established by means of a diffuser.

Another object of this invention is to provide a novel instrument of the type characterized above in which the active volume of the instrument is the volume of the case.

Another object of this invention is to provide a novel combination of elements constituting means for compensating a rate of climb indicator for changes in temperature.

A further object of this invention is to provide a novel instrument of the above type that requires no compensation for changes in altitude.

A further object of this invention is to provide a novel instrument of the above type which requires no dehumidifying means.

A still further object of this invention is to provide a novel instrument of the above type that requires no external chamber.

A further object of this invention is to provide a novel rate of climb indicator of dependable performance, simple construction, and few parts, and one which is accurate under all conditions of operation.

Other and further objects of this invention will appear from the following description.

One embodiment of the invention is illustrated in the accompanying drawings but it is to be expressly understood that said drawings are for purposes of illustration only and are not to be construed as a definition of the limits of the invention, reference being had to the appended claims for this purpose.

In the drawings:

Fig. 1 is a side elevation, partly in section, of the operating mechanism of one embodiment of the present invention with the case removed;

Fig. 2 is an enlarged sectional view of the diffusing means shown in Fig. 1;

Figure 3:
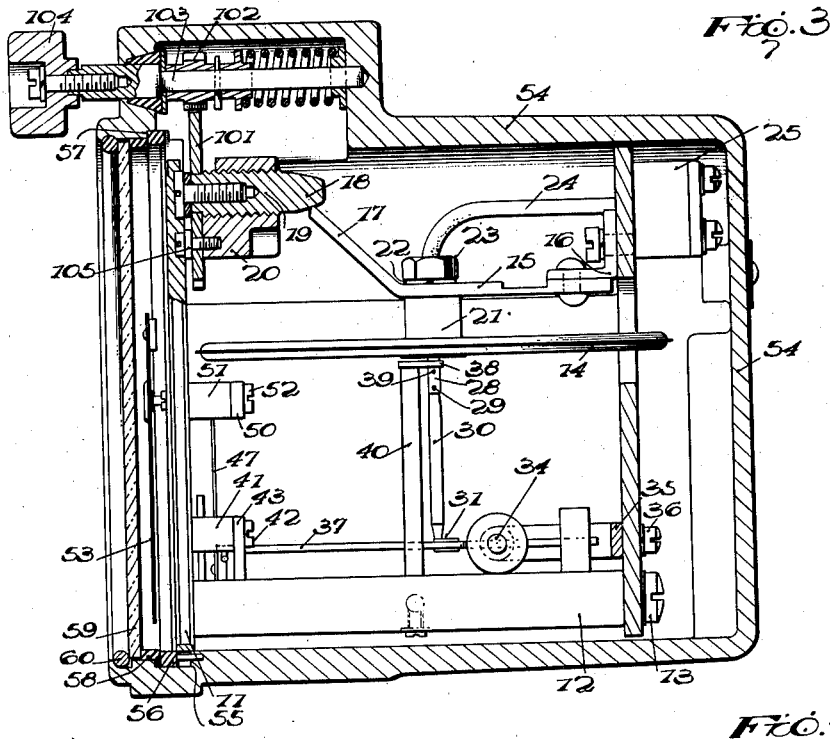
Fig. 3 is a sectional elevation of a complete instrument embodying the invention.

In the accompanying drawings, in which like reference numerals indicate like parts, the operating mechanism is mounted within any suitable casing on a frame of any suitable type and construction which, as shown, comprises a rear frame member or plate 10 and a face plate 11, said plates being held in spaced relation in any suitable manner as by the spacers 12 and screws 13. Mounted in the frame thus constituted is a pressure responsive element 14 of any suitable type that is adapted to operate any suitable indicator or pointer when a pressure differential is established between the pressure inside the element and the pressure surrounding the element within the casing. This may be accomplished as, for example, by providing for communication between the inside of the pressure responsive element and the atmosphere outside the casing of the instrument, while interposing diffusing means between said outside atmosphere and the inside of the casing in which said element is mounted.

As shown in the drawings by way of example, the pressure responsive element 14 comprises a diaphragm capsule mounted in any suitable manner on a flexible arm 15 that is carried on a bracket 16 secured to the plate 10. To provide for zero adjustment of the instrument, the end 17 of the flexible arm 15 is bent at an angle to said arm and engages the coned end 18 of a set screw 19 that is threaded in a bracket 20 formed as part of one of the spacers 12. The pressure responsive element 14 may be supported by means of a central boss 21 that extends through the flexible arm 15 and is secured thereto by means of a lock washer 22 and a nut 23, said boss being hollow and connected to a tube 24 that is in open communication with the atmosphere outside the instrument case in any suitable manner. As shown, said tube 24 leads to a coupling chamber 25 and a second tube 26 leads from said chamber 25 to a second coupling chamber 27 that is suitably vented to the outside atmosphere through the casing of the instrument as hereinafter described.

Suitable actuating connections are provided between said pressure responsive element 14 and the indicator or pointer of the instrument. In the form shown, a post 28 extends centrally from the element 14 on the side opposite the boss 21 and is pivotally connected at 29 with one end of a link 30. The other end of said link 30 is pivotally connected at 31 (see Fig. 4) to a rock arm 32 on a rock shaft 33 that is rotatably mounted in bearings 34 carried by a bracket 35 secured to the plate 10 in any suitable manner as by screws 36. Also carried by said rock shaft 33 is a counter-weighted arm 37 which is swung by the connections described about the axis of said shaft 33 in response to contraction and expansion of the pressure responsive element 14. For limiting the movement of the element 14, post 28 is embraced by a fork 38 that is engaged by the element 14 on expansion thereof and by a pin 39 secured to the post 28 on contraction of said element. The position of said fork 38 is adjustable in any suitable manner as by mounting it on a rod 40 adjustably carried by one of the spacers 12.

Suitably mounted on the face plate 11, as by means of spacers 41 and screws 42, is a plate 43 in which is rotatably mounted a spindle 44. An arm or finger 45 extends from the spindle 44 and is engaged by the end of the arm 37 for rotation thereby in one direction, and a suitable hair spring 46 tends to rotate said spindle 44 in the opposite direction whereby expansion and contraction of the pressure responsive element 14 is converted into rotation of said spindle 44 in one or the other direction. A counter-weighted gear sector 47 carried by said spindle 44 meshes with a pinion 48 on a second spindle 49 that is rotatably mounted in a plate 50 held in spaced relation from the face plate 11 by suitable spacers 51 and screws 52. Said spindle 49 extends through the face plate 11 and carries at its outer end a pointer 53.

Figure 4:
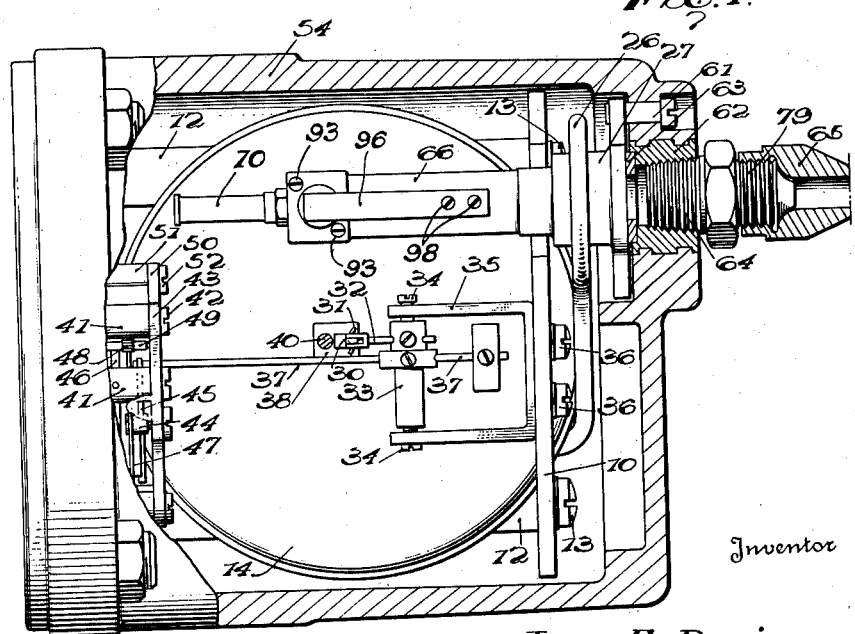
Fig. 4 is a sectional elevation of the instrument of Fig. 3 from a different angle.

The mechanism above described is mounted in an instrument casing of any suitable type, said casing being so constructed as to provide a substantially sealed chamber enclosing the pressure responsive element 14, the interior of said chamber communicating with the atmosphere outside the casing through diffusing means of the type described generally above. As shown in Figs. 3 and 4, said mechanism is enclosed by a casing 54 of any suitable material such as "Bakelite", the face plate 11 being seated against a shoulder 55 formed in said casing and being held therein by a split ring 56 which engages the underside of a shoulder 57 formed in the casing. The upper end of the casing is suitably closed as by means of a split spacing ring 58 and a cover glass 59 held in place by a suitable split ring 60.

The coupling member 27 is provided with ears engaged by bolts 61 extending through said casing 54 and adapted to maintain a tight seal between said coupling member and a bushing 62, a suitable washer or gasket 63 preferably being used for this purpose. If desired, said bushing 62 may be internally threaded to receive a nipple 64 to which may be connected a tube fitting 65 whereby the pressure responsive element 14 may be vented to any desired point remote from the instrument itself.

With certain of the diffusing means of the type referred to above, the rate at which diffusion takes place depends on molecular velocity of the atmosphere which velocity increases at high altitudes as the atmosphere becomes less dense and also increases as the temperature increases. By changing the material, construction and crystalline structure of the diffusers, the rate of diffusion with changes in pressure or temperature may be varied as desired, as explained in detail in copending application 101,346. The effect of a high rate of diffusion is that the differential pressures available to actuate the pointer 53 are less and the reading of the instrument may be too low. Hence, the present invention includes means for changing the effect of the diffusing medium at low temperatures by providing two or more diffusing means arranged serially with respect to the path of the atmosphere leaving or entering the casing, with a temperature controlled valve means whereby part of said diffusing means is by-passed to a greater or less extent as the temperature changes. Dependent upon the particular diffusion material, one of the diffusers can be increasingly by-passed on increasing temperature or decreasingly by-passed on increasing temperature. Preferably such means is mounted on and connected with the coupling member 27 whereby the same venting means are employed for the casing and for the pressure responsive element, and as shown in Figs. 1 and 4, said temperature controlled diffusing means, indicated generally at 66, are mounted directly on said coupling member 27 and extend inwardly therefrom within the casing 54.

Fig. 2 shows in detail one form of combined diffusing means and temperature controlled by-pass means such as described above. Referring to this figure, said means comprises a suitable casing 67 which may have any desired form and which as shown is substantially tubular so as to provide a chamber 68. Suitable diffusing elements are provided for closing the ends of said casing 67, one of which controls the diffusion of air between the instrument casing and the chamber 68 while the other controls diffusion between said chamber 68 and the outside atmosphere. Said chamber is also provided with an outlet in which is disposed a temperature controlled by-pass valve so that air passing between the inside and outside of the instrument casing 54 must pass through both diffusers except to the extent that it flows past said by-pass valve after having passed through only one diffuser.

The diffusers may be of any suitable type, form and material, and as here shown, they comprise tubes 69 and 70 made of thin porcelain, although other suitable materials such as carbon, paper, thin metal, etc., can be employed as disclosed in the aforesaid Rylsky application. Tube 69 is closed at one end by a cap 71 and is mounted at its other end in a fitting 72 secured in the end of casing 67 whereby said diffuser constitutes a closure for one end of said casing 67. In order to save space, said tube 69 in the form shown is disposed in the chamber 68, the fitting 72 being threaded in a base 73 which in turn is threaded in the end of the casing 67. An air-tight connection between the fitting 72 and base 73 is effected by means of sealing material 74 and said fitting and base are provided with axially aligned passages 75 and 76, respectively, whereby air may enter or leave the chamber 68 by way of said aligned passages and by diffusion through the porous wall of the tube 69.

Base 73 is also adapted in the form shown to mount the diffusing means on the coupling member 27 and as shown in Fig. 1, said base is seated in a recess 77 in said coupling member and is held tightly against an interior flange 78 thereof by means of a threaded sleeve 79 having a head 80 engaging the opposite side of said flange. Airtight seals may be provided between the flange 78 and the head 80 and between said flange and the base 73 by the use of suitable sealing material 81.

The other diffusing tube 70 is closed at one end by a cap 82 and is seated at the other end in a fitting 83 that is threaded at 84 in the opposite end of casing 67, said tube 70 thereby forming a closure for the opposite end of the chamber 68. Sealing material 85 provides an air-tight connection between the fitting 83 and the casing 67.

Intermediate its ends, casing 67 is provided with a transverse passage 86 which extends from the chamber 68 through the wall of the casing. Said passage 86 is controlled by a valve 87 and valve seat 88 formed in the outer end of a cup 89, the valve stem 90 extending slidably through the bottom of the cup, and a coil spring 91 being interposed between said bottom and said valve 88 and normally tending to maintain the valve open. Mounted on the casing 67 in any suitable manner, as by means of a spacer block 92 and screws 93, is an arm 94 carrying suitable temperature responsive means adapted to cooperate with the end of the valve stem 90 which extends outwardly through openings in the spacer block 92 and arm 94 and passes slidably through a suitable perforated guide 95. In the form shown, said temperature responsive means comprises a bimetallic strip 96 mounted at its end on the arm 94 in any suitable manner as by means of the block 97 and screws 98 and having its free end disposed so as to engage and depress the valve stem 90. Adjustment of the position of said bimetallic strip may be obtained by means of a set screw 99 threaded in any one of a plurality of openings 100 that are formed in the arm 94.

When the pressures inside the element 14 and inside the casing 54 are equalized, pointer 53 may be adjusted to read zero on a suitable scale by means of the set screw 19 in Fig. 1, which shifts the position of the element 14. If desired for convenience in making this adjustment, said set screw 19 may be actuated from outside the casing by any suitable means such as that shown in Fig. 3, wherein the set screw 19 carries a gear 101 meshing with a pinion 102 having an operating shaft 103 and knob 104 disposed outside the casing, a suitable locking means such as the set screw 105 being also provided if desired.

Now if there is an increase in altitude, the atmospheric pressure surrounding the instrument decreases in proportion to the rate of change in altitude or the rate of climb and the pressure within the pressure responsive element 14 decreases correspondingly as this element is in open communication with the atmosphere surrounding the instrument. However, the pressure within the instrument case 54 cannot instantaneously equalize with the outside atmospheric pressure as the gases within the case must escape through the porous diffuser element 70 or past the valve 87 into the chamber 68 and thence through the diffuser element 69. Hence the pressure within the case 54 is greater than that in the pressure responsive element 14 and the magnitude of the pressure differential is proportional to the rate of increase in altitude. This pressure differential will compress the pressure responsive element 14 which through the connections described above will cause rotation of the pointer 53 to indicate the rate of climb. If the increase in altitude is stopped and the instrument remains at a constant altitude, then the gases in case 54 will escape through the diffuser assembly and equalize the pressure in case 54 with that in the pressure responsive element 14, whereupon pointer 53 will be returned to its normal or zero position.

Similarly if the altitude is decreased then the pressure surrounding the instrument case 54 and the pressure in pressure responsive element 14 increases in proportion to the rate of decrease in altitude. The pressure within air-tight case 54 cannot instantaneously equalize with the atmospheric pressure as the gases from without must enter through diffuser element 69 and through diffuser element 70 or past valve 87. Hence, the pressure in pressure responsive element 14 is greater than that in case 54 and the magnitude of the pressure differential is proportional to the rate of decrease in altitude. Under the action of this pressure differential, pressure responsive element 14 will expand and through the connections described above pointer 53 will be rotated in a direction to indicate the rate of decrease in altitude. If the decrease in altitude is stopped and the instrument remains at a constant altitude, the gases from the outside of case 54 will enter the case through the diffuser assembly and the pressure in said case will be equalized with that in the element 14, whereupon the pointer 53 is returned to its normal or zero position on scale 50.

Temperature compensation is effected in the diffuser assembly by the valve 87 and temperature responsive element 96. Temperature responsive element 96 is preferably adjusted by set screw 99 so that at room temperature valve 87 will be raised from its seat by spring 91, and most of the gases passing through the diffuser assembly will pass valve 87 and diffuser element 69 thereby by-passing element 70, only a small part passing through said diffuser element. As the temperature lowers, temperature responsive element 96 forces valve stem 90 downward and moves valve 87 closer to its seat so that a decreasing part of the gases will pass valve 87 and an increasing part of the gases will be forced to pass through diffuser element 70. Cold temperature, which, with the porcelain diffuser, is accompanied by an increased rate of diffusion is thus compensated by increasing the amount of diffusion that must take place, and this compensation is effected automatically in a simple, compact and efficient device. If the particular material used as a diffuser decreases its rate of diffusion with decrease in temperature the by-pass action is merely reversed.

Altitude compensation is effected by the characteristics of the thin porous diffuser elements 69 and 70. Gases passing through these diffuser elements do so by a combination of flow and diffusion processes. Due to the combination of these two effects a correct rate of climb can be indicated regardless of the altitude at which it occurs.

No dehumidifying mechanism is necessary in the present invention. By completely sealing case 54 all gases passing into said case are thoroughly filtered through the diffuser elements 69 and 70, protecting the mechanism from dust and humidity. By utilizing the volume of the case as the active volume of the instrument, the need for external volumes is eliminated and the instrument rendered more compact and of lighter weight. The use of diffusing means of the type described not only provides compensation for temperature and altitude, but makes possible increased sensitivity and extremely small lag as compared with the capillary type of instrument, thereby making the use of an external volume unnecessary.

While only one embodiment of the invention has been described herein and illustrated in the drawings, it will be understood that the invention is not limited thereto but is capable of a variety of physical embodiments, many of which will now be apparent to those skilled in the art, and that changes may be made in the form, details of construction, and arrangement of the parts and in the materials used, all without departing from the spirit of the invention. Reference is accordingly to be had to the appended claims for a definition of the limits of the invention.

What is claimed is:

1. In an instrument of the class described, a diffuser assembly comprising a plurality of diffuser elements, and means controlled by temperature responsive means for rendering certain of said diffuser elements ineffective.

2. In an instrument of the class described, a diffuser assembly comprising a plurality of porous diffuser elements, and means controlled by temperature responsive means for rendering certain of said diffuser elements ineffective.

3. In an instrument of the class described, a diffuser assembly comprising a plurality of porous porcelain diffuser elements, and means controlled by temperature responsive means for rendering certain of said diffuser elements ineffective.

4. In an instrument of the class described, a diffuser assembly comprising a pair of porous diffuser elements, and means controlled by temperature responsive means for by-passing one of said diffuser elements.

5. In an instrument of the class described, a diffuser assembly comprising a pair of porous porcelain diffuser elements, and means controlled by temperature responsive means for by-passing one of said diffuser elements.

6. In an instrument of the class described, a diffuser assembly comprising a plurality of diffuser elements and means controlled by temperature responsive means for by-passing certain of said diffuser elements.

7. In an instrument of the class described having a pressure chamber, means whereby the atmosphere inside and outside said chamber is in communication comprising a plurality of diffuser elements serially arranged in the path of travel of said atmosphere, and temperature responsive by-pass means for by-passing one of said elements.

8. In an instrument of the class described having a pressure chamber, means whereby the atmosphere inside and outside said chamber is in communication comprising a plurality of diffuser elements serially arranged in the path of travel of said atmosphere, by-pass means for one of said elements, a normally open valve for said by-pass means, and temperature responsive means for closing said valve at low temperatures.

9. In an instrument of the class described having a pressure chamber, means whereby the atmosphere inside and outside said chamber is in communication comprising a hollow casing, diffusing means interposed between said casing and said inside atmosphere, diffusing means interposed between said casing and said outside atmosphere, said casing having an opening communicating with one of said atmospheres, and temperature responsive means for controlling said opening.

10. Diffuser means comprising a hollow body, a diffuser element closing one end of the hollow portion, a second diffuser element closing the opposite end of the hollow portion, a valve controlling an opening into said hollow portion, and temperature responsive means for actuating said valve.

11. Diffuser means comprising a hollow body, a porous diffuser element disposed within and closing one end of said hollow body, a second porous diffuser element disposed on the outside of and closing the other end of said hollow body, and temperature responsive by-pass means to by-pass one of said diffuser elements.

12. Diffuser means comprising a substantially tubular body, a porous diffuser element disposed within and closing one end of said hollow body, a second porous diffuser element disposed on the outside of and closing the opposite end of said hollow body, and means to by-pass one of said elements including a valve opening into said hollow body portion and temperature responsive means to operate said valve.

13. Diffuser means comprising a substantially tubular body, diffusing elements closing the opposite ends thereof, one of said elements being substantially tubular and disposed within said body, said body having an opening intermediate its ends leading into the hollow portion and temperature controlled valve means for controlling said opening.

14. Diffuser means comprising a pair of substantially tubular elements of diffusing material connected to form a closed chamber, a wall in said chamber containing conduit means traversing the same and temperature responsive means controlling said conduit means.

15. Diffuser means comprising a pair of substantially tubular elements of diffusing material, means connecting the same to form a chamber closed except for an opening in its wall, and a temperature responsive valve means for said opening.

16. In an instrument of the class described, a substantially air-tight case, a pressure responsive element in said case in communication with the atmosphere outside of said case, a diffuser assembly whereby said case is in communication with the atmosphere outside thereof and comprising a plurality of diffuser elements certain of which are in direct communication with said outside atmosphere, and temperature responsive by-pass means to by-pass all of said diffuser elements but those in communication with the atmosphere outside of said case.

17. In an instrument of the class described, a substantially air-tight case, a pressure responsive element within said case in communication with the atmosphere outside of said case, a diffuser assembly whereby said case is in communication with the atmosphere outside thereof comprising a pair of diffuser elements in series one of which is in direct communication with said outside atmosphere, and temperature responsive by-pass means for by-passing the other of said pair of diffuser elements.

18. In an instrument of the class described, a substantially air-tight case, a pressure responsive element within said case in communication with the atmosphere outside of said case, means actuated by said pressure responsive element, a diffuser assembly within said case controlling the passage of air from said case to the atmosphere outside of said case comprising a hollow body, a hollow diffuser element within said body to close one end thereof and having its interior in communication with the atmosphere outside of said case, a second hollow diffuser element outside of said hollow body and closing the other end thereof, and temperature responsive by-pass means to by-pass said second named diffuser element.

19. In an instrument of the class described, a substantially air-tight case, a pressure responsive element within said case in communication with the atmosphere outside of said case, indicating means actuated by said pressure responsive element, a diffuser assembly within said case controlling the passage of air from said case to the atmosphere outside of said case comprising a substantially tubular body, a tubular diffuser element within said body portion to close one end thereof and having its interior in communication with the atmosphere outside of said case, a second diffuser element closing the other end thereof, and temperature responsive valve means in said body between said diffuser elements providing an adjustable passage between the inside and outside of said body.

20. In a rate of climb indicator, a substantially air-tight case, a pressure responsive element within said case in communication with the atmosphere outside of said case, a pointer and means operatively joining said pointer and said pressure responsive element, and a diffuser assembly mounted within said case for controlling the passage of air from said case to the atmosphere outside of said case comprising a hollow body, a diffuser element closing said body at one end within said case, a second diffuser element closing said body at the other end and contained within said body and in communication with the atmosphere outside of said case, and a temperature responsive valve means in said body between said diffuser elements providing an adjustable passage between the inside and the outside of said body whereby, upon a change in altitude, a pressure differential is established between the pressures in said case and in said pressure responsive element to actuate said pressure responsive element and move said pointer.

21. In a rate of climb indicator, a substantially air-tight case, a pressure responsive element within said case in communication with the atmosphere outside of said case, a pointer operatively connected with said pressure responsive element, and a diffuser assembly mounted within said case for controlling the passage of air from said case to the atmosphere outside of said case and comprising a hollow body having one end mounted on said case and the other end within said case, a porous diffuser element closing said body at its end within said case, a second porous diffuser element closing said body at the other end and interposed between the same and the atmosphere outside of said case, and a temperature responsive valve means in said body between said diffuser elements providing an adjustable passage whereby, upon a change in altitude, a pressure differential is established between the pressures in said case and in said pressure responsive element to actuate said pressure responsive element and move said pointer.

22. In combination, means defining a chamber comprising an expansible diaphragm having a yielding wall subject to atmospheric pressure on one side thereof, a plurality of diffuser elements for retarding the rate at which pressure on the other side of said yielding wall tends to become equal to a changing atmospheric pressure, indicating means actuated by said yielding wall in accordance with the rate of change of altitude, and temperature responsive by-pass means for by-passing one of said diffuser elements.

23. In combination, means defining a chamber comprising an expansible diaphragm having a yielding wall subject to atmospheric pressure on one side thereof, a plurality of diffuser elements for retarding the rate at which pressure on the other side of said yielding wall tends to become equal to a changing atmospheric pressure, indicating means actuated by said yielding wall in accordance with the rate of change of altitude, valve means for by-passing one of said diffuser elements, and temperature responsive means for operating said valve means.

24. In combination, means providing a chamber containing a gas, means for controlling the flow of said gas from said chamber, said means comprising a plurality of diffuser elements through which said gas is adapted to flow from said chamber, and means controlled by temperature responsive means for regulating the flow through a respective diffuser element.

25. In a device of the class described, a diffuser assembly comprising a plurality of diffuser elements, and control means responsive to changes in temperature for rendering certain of said diffuser elements ineffective.

26. In combination, an expansible diaphragm device having a yielding wall subject to a changing atmospheric pressure on one side thereof, a plurality of diffuser elements for retarding the rate at which pressure on the other side of said yielding wall tends to become equal to said changing atmospheric pressure, and control means responsive to changes in temperature for modifying the retarding action of at least one of said diffuser elements.

JAMES E. BEVINS.